US012081398B2

(12) United States Patent
Ro

(10) Patent No.: US 12,081,398 B2
(45) Date of Patent: Sep. 3, 2024

(54) MONETARY VULNERABILITY ASSESSMENT (MVA) OF A REPARABLE INFRASTRUCTURE SYSTEM

(71) Applicant: Autodesk, Inc., San Rafael, CA (US)

(72) Inventor: Junje Ro, Arcadia, CA (US)

(73) Assignee: AUTODESK, INC., San Francisco, CA (US)

( * ) Notice: Subject to any disclaimer, the term of this patent is extended or adjusted under 35 U.S.C. 154(b) by 335 days.

(21) Appl. No.: 17/708,971

(22) Filed: Mar. 30, 2022

(65) Prior Publication Data

US 2023/0318920 A1  Oct. 5, 2023

(51) Int. Cl.
| | |
|---|---|
| *H04L 41/08* | (2022.01) |
| *G06Q 10/06* | (2023.01) |
| *G06Q 10/0637* | (2023.01) |
| *H04L 41/0823* | (2022.01) |
| *H04L 41/0826* | (2022.01) |

(52) U.S. Cl.
CPC ... *H04L 41/0836* (2013.01); *G06Q 10/06375* (2013.01); *H04L 41/0826* (2013.01)

(58) Field of Classification Search
CPC ............. H04L 41/0836; H04L 41/0826; H04L 41/149; G06Q 10/06375
See application file for complete search history.

(56) References Cited

U.S. PATENT DOCUMENTS

| | | | | |
|---|---|---|---|---|
| 10,796,394 | B2* | 10/2020 | Wani ...................... | G06N 20/10 |
| 2012/0072357 | A1* | 3/2012 | Bradford ............ | G06Q 30/0283 |
| | | | | 705/306 |
| 2014/0278809 | A1* | 9/2014 | Ekman ............... | G06Q 30/0205 |
| | | | | 705/7.35 |
| 2017/0337498 | A1* | 11/2017 | Rahimi ............ | G06Q 10/06375 |
| 2018/0336652 | A1* | 11/2018 | Wani ................ | G06Q 10/06375 |
| 2019/0025810 | A1* | 1/2019 | Chapin ................. | F01D 21/003 |

OTHER PUBLICATIONS

Dzobo et al., "Investigating the use of probability distribution functions in reliability-worth analysis of electric power systems", Sep. 2011, Electrical Power and Energy Systems 37 (2012) 110-116. (Year: 2011).*
Chen et al., "Ecosystem service benefits and costs of deep-sea ecosystem restoration", Apr. 2021, Journal of Environmental Management 303 (2022) 114127. (Year: 2021).*

(Continued)

*Primary Examiner* — Mohammad Ali
*Assistant Examiner* — Kelvin Booker
(74) *Attorney, Agent, or Firm* — Gates & Cooper LLP

(57) ABSTRACT

A method and system provide the ability to estimate the vulnerability of a repairable infrastructure system. A survival curve is constructed for one or more assets. A rehabilitation plan is prescribed for one or more failure states of the repairable infrastructure system. A cost estimation model is constructed for costs associated with the repairs for each of the failure states. A planning basis is specified. A multiple probability simulation is conducted that estimates a potential restoration cost for a possible failure. The simulation is repeated to acquire a distribution of potential restoration costs. A vulnerability estimation is determined and provided based on the distribution.

20 Claims, 11 Drawing Sheets

(56) References Cited

OTHER PUBLICATIONS

Halil et al., "A Conceptual Study on the Monte Carlo Simulation for Cost Forecasting in the Green Building Project", Mar. 2020, 8th AMER International Conference on Quality of Life. (Year: 2020).*

Luengo et al., "A survey of Monte Carlo methods for parameter estimation", 2020, EURASIP Journal on Advances in Signal Processing. (Year: 2020).*

Seo et al., "Probabilistic seismic restoration cost estimation for transportation infrastructure portfolios with an emphasis on curved steel I-girder bridges", Jan. 2015, Structural Safety 65 (2017) 27-34. (Year: 2015).*

"Monte Carlo method", Wikipedia, https://en.wikipedia.org/wiki/Monte_Carlo_method, last edited Jul. 16, 2022, pp. 1-12.

* cited by examiner

FIG. 6A

| Diameter | Paved | CAS | CIPP | CP |
|---|---|---|---|---|
| Diameter <= 4 | No | $50.00 /ft (length) | $50.00 /ft (length) | $50.00 /ft (length) |
| | Yes | $75.00 /ft (length) | $75.00 /ft (length) | $75.00 /ft (length) |
| 4 < Diameter ... | No | $100.00 /ft (length) | $100.00 /ft (length) | $100.00 /ft (length) |
| | Yes | $75.00 /ft (length) | $75.00 /ft (length) | $75.00 /ft (length) |
| 6 < Diameter ... | No | $100.00 /ft (length) | $100.00 /ft (length) | $100.00 /ft (length) |
| | Yes | $125.00 /ft (length) | $125.00 /ft (length) | $125.00 /ft (length) |
| 8 < Diameter ... | No | $150.00 /ft (length) | $150.00 /ft (length) | $150.00 /ft (length) |
| | Yes | $125.00 /ft (length) | $125.00 /ft (length) | $125.00 /ft (length) |
| 10 < Diameter ... | No | $150.00 /ft (length) | $150.00 /ft (length) | $150.00 /ft (length) |
| | Yes | $175.00 /ft (length) | $175.00 /ft (length) | $175.00 /ft (length) |
| 12 < Diameter ... | No | $188.00 /ft (length) | $188.00 /ft (length) | $188.00 /ft (length) |
| | Yes | $175.00 /ft (length) | $175.00 /ft (length) | $175.00 /ft (length) |
| 15 < Diameter ... | No | $188.00 /ft (length) | $188.00 /ft (length) | $188.00 /ft (length) |

*FIG. 6B*

MONETARY VULNERABILITY ASSESSMENT (MVA) OF A REPARABLE INFRASTRUCTURE SYSTEM

BACKGROUND OF THE INVENTION

1. Field of the Invention

The present invention relates generally to physical infrastructure systems, and in particular, to a method, apparatus, system, and article of manufacture for providing an assessment of the vulnerability of a physical infrastructure system across multiple restoration plans and/or system states.

2. Description of the Related Art

There exists an unavoidable nature of uncertainty for every physical system (e.g., a water network management system, pavement management system, and/or other asset management systems in transportation, power and energy, or other disciplines relating to municipal utilities). Such uncertainties may relate to how and when the physical system will fail, which aspect/component of a system to repair and how long such a repair will last, etc. Further, with a given state of a system, it may be desirable to employ different investment strategies to renovate/improve/repair its components or assets. In addition, each renovation/improvement/repair may further affect the vulnerability of a system. The issue then becomes how to measure such a vulnerability (e.g., before performing the renovation/improvement/repair) and choose which improvement action to take. The prior art fails to provide such a capability. Similarly, for the consideration of the return of investment (ROI), the prior art fails to provide a comprehensive and understandable measure regarding how and what actions/improvements to perform in order to maximize the ROI over a defined time period.

As an example, some prior art systems (e.g., the INFOMASTER or INFOASSET PLANNER products) may provide a user-definable and risk-based rehabilitation planning system for water distribution, wastewater collection, and stormwater drainage networks. However, such systems fail to provide (1) a versatile cost estimation module to model the various forms of rehabilitation/repair options, and (2) the ability tangibly capture the uncertain nature of a system to improve a risk-based only algorithm.

In view of the above, what is needed is a method and system that solves the lack of a common basis to capture the vulnerability (the tendency of failure) of a repairable infrastructure system, so a high-level comparison can be made across various service improvement or restoration plans or system states.

SUMMARY OF THE INVENTION

Embodiments of the invention provide an innovative scoring scheme that translates the vulnerability of a system from an abstract quality into a tangible property that is easily understandable and comparable. Embodiments of the invention achieve this capability by uniquely combining a random sampling algorithm, a calibrated asset deterioration model for each key asset, an improvement or repair decision plan, and a comprehensive cost estimation module. The score derived from the final distribution is in a monetary value enabling the vulnerability of a system to be easily compared with another state or another system (that is neither relevant nor similar to the original system) based on a commonly employed set of deterioration, rehabilitation/repair, and costing models.

BRIEF DESCRIPTION OF THE DRAWINGS

Referring now to the drawings in which like reference numbers represent corresponding parts throughout:

FIGS. 6A and 6B illustrate an exemplary detailed listing/library of an estimated cost for the repair/replacement of various assets within a water distribution network in accordance with one or more embodiments of the invention;

DETAILED DESCRIPTION OF THE INVENTION

Figure 1:
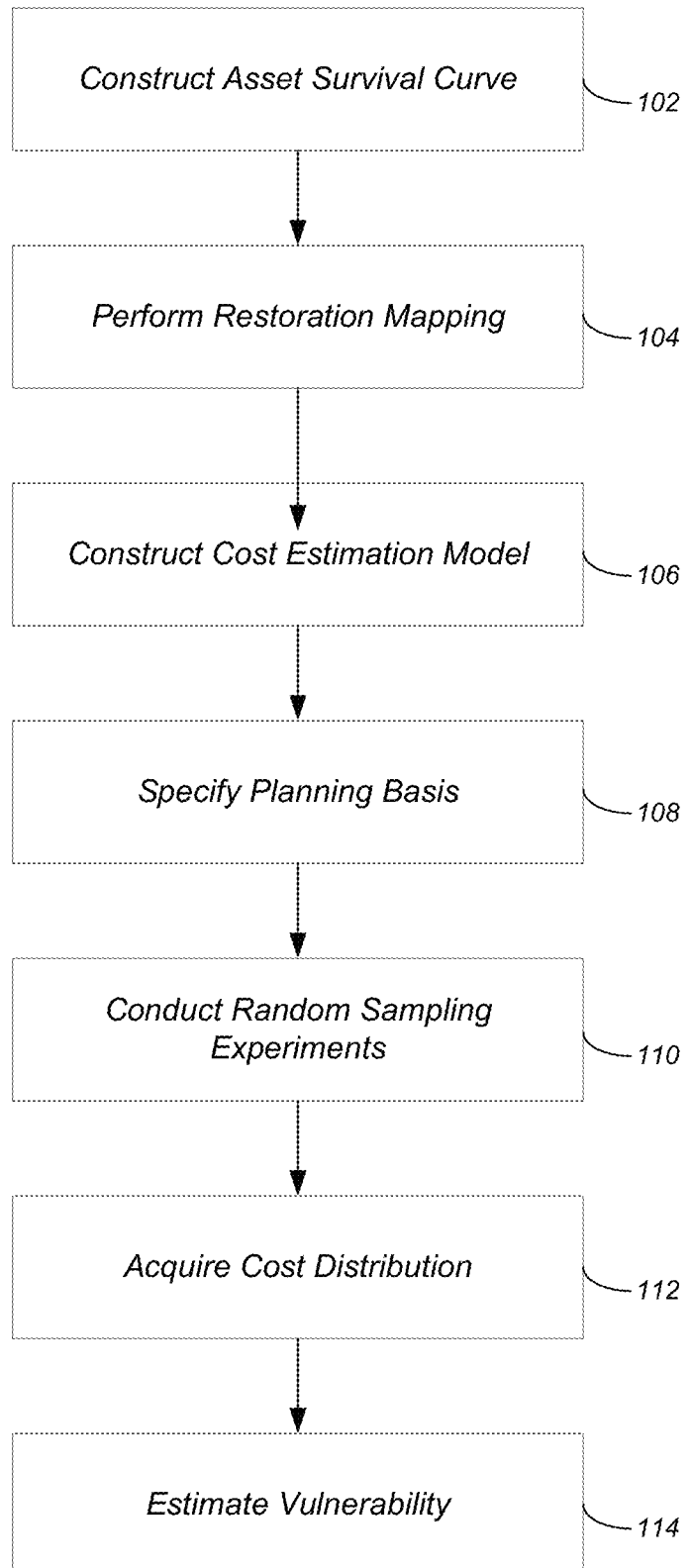
FIG. 1 illustrates the process flow for performing a monetary vulnerability assessment (MVA) in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention employ a random sampling method (e.g., the Monte Carlo method) to capture a system vulnerability as an overall cost of the required service improvement or restoration. The sampling algorithm first randomly triggers a possible failure scenario for each key asset or component according to their calibrated deterioration or failure models. The system then finds the cost of a required repair action or project in order to sustain or improve the service level. Repeated simulations form a statistical distribution in the total cost that represents the vulnerability of a state of a repairable system. A single monetary value and its corresponding variation can be determined from the distribution within an acceptable confidence threshold.

Subsequent to fixing the deterioration/failure models, the strategy of repair project mapping, and the comprehensive level of a cost estimation, two different states of a system can be compared through their different monetary scores. Further, each state of a system may contain a different investment strategy to renovate/improve/repair its components or assets. According to the deterioration or failure model, every improvement action will introduce a different renewal effect thus resulting in a different reduction towards the overall vulnerability of a system. Embodiments enable the measurement and comparison of different systems based on such a deterioration/failure model. Similarly, for the consideration of the return of investment, embodiments of the invention enable the evaluation of different allocation schemes toward two different systems.

Definitions

Various definitions are used to identify aspects of embodiments of the invention that provide a monetary vulnerability assessment (MVA) of a reparable (infrastructure) system.

Monetary Assessment—the result of an evaluation or estimation of something into a perceived measurement that relates to money or currency.

Vulnerability—the quality of state of a system being exposed to the possibility of failure preventing it from delivering its function or service.

Infrastructure—the basic physical and organizational structures and facilities (e.g., buildings, road, water & power supplies, civil services, etc.) needed for the operation of a society or enterprise.

Reparable System—a system for which it is possible to restore lost functions through replacing or repairing the system's components.

Monetary Vulnerability Assessment (MVA)

A quantitative estimation of vulnerability (uncertainty of failure) is one of the most challenging efforts in assessing the return on investment (ROI) of an improvement strategy or plan for an infrastructure system. In this regard, one of the goals (of embodiments of the invention) is to estimate a monetary value of the vulnerability of a reparable system according to the failure history of its assets and the knowledge of the corresponding rehabilitation plans and costs. In other words, embodiments of the invention provide an application that provides return on investment decision support for how and whether to sustain or improve a reparable system. Further, for comparison purpose across different locations and/or improvement plans, embodiments of the invention transform the quantitative estimation into a monetary amount representing the required investment efforts.

Criteria that embodiments of the invention may require are:

(1) The system is reparable;
(2) Every important asset of the system is associated with a failure or service deterioration model to predict its chance of failure or functional degeneration along its age; and
(3) The cost of investment to restore a failure or a decreased service level can be estimated.

Based on this criteria, embodiments of the invention provide a system to evaluate vulnerabilities of an infrastructure system. Once a baseline vulnerability has been established, the benefits of any improvement to that system can be calculated because it reduces the vulnerability of the system. In this regard, any change/improvement to the system changes the state(s) of the system and an additional vulnerability analysis can be performed and compared to the baseline. This difference may be transformed into a monetary amount enabling a user to gauge the benefit of an investment or improvement on different system components.

To enable such an MVA, embodiments of the invention generate a probability distribution reflecting the probability of maintaining the functional service level of a system. The probability distribution is based on a restoration of every potentially failed asset of a reparable system using a random sampling algorithm (to trigger the potential failure). Numerical results may then be drawn from the probability distribution.

FIG. 1 illustrates the process flow for performing a monetary vulnerability assessment in accordance with one or more embodiments of the invention. In other words, FIG. 1 illustrates the logical flow for estimating the vulnerability of a repairable infrastructure system.

At step 102, an asset survival curve (for one or more assets) is constructed. To construct/generate such a curve, a time vs. failure probability model is constructed and calibrated for every significant asset or component. Such a survival curve reflects the chance/probability an asset/component will fail at a certain age. In other words, the survival curve provides a survival probability for a corresponding asset of the one or more assets based on age. To construct the survival curve, the following steps may be performed: (i) failure records are collected from the infrastructure system; (ii) a set of the one or more assets that have no failure records are determined (wherein the set represents survived assets); (iii) the survived assets are clustered into one or more sub-groups (e.g., based on a sensitivity analysis); (iv) regression analysis is performed on the one or more sub-groups to acquire a failure probability density function for the infrastructure system based on the failure records; a probability density curve is derived for each of the survived assets based on the failure probability density function (wherein the probability density curve represents a probability that the survived asset will fail based on age); and (v) a survival curve is derived for each of the one or more assets by accumulating a survival probability from the probability density curves based on age.

At step 104, a restoration mapping is performed. The mapping prescribes a rehabilitation plan along with its effective restoration for every possible failure state (of the repairable infrastructure system). In other words, the mapping identifies, for each failure state, the plan for how to restore the function(s) of the system upon the occurrence of the failure state. More specifically, the rehabilitation plan identifies a restoration for each of the failure states and each restoration identifies repairs for the assets (to restore the failure state).

At step 106, a comprehensive cost estimation model is constructed/obtained covering all possible repair actions (i.e., for the repairs for each of the failure states in the rehabilitation plan). This step identifies (within a model) the direct/indirect costs to perform/execute the rehabilitation plan. In other words, the cost estimation model may include direct costs for direct labor and materials, as well as indirect costs for losses or impacts due to the one or more failure states and the repairs.

For example, when a pipe fails, the entire pipe may not need to be replaced, and instead, lining may be inserted within the pipe thereby narrowing the pipe diameter. Thus, two different rehabilitation plans may be established in step 104 (with the cost estimation performed in step 106)—one for replacing the pipe and another for inserting lining in the pipe. The direct costs associated with each plan are determined and defined in the model—i.e., the monetary costs for inserting the lining, and the monetary costs for replacing the pipe. Such direct costs may also include transportation costs for transporting the pipe, the cost of the pipe itself, labor costs for performing the work, etc. Indirect costs associated with the rehabilitation plans may also be set forth in the model in step 106. Such indirect costs may include the social costs such as traffic delays, reduced flow rates, neighborhood beautification issues, etc. The indirect costs may be transformed into a monetary value for comparison purposes. Thus, the model determines the total cost (e.g., actual and perceived) to repair the system as well as the cost to bear the failure (e.g., if the rehabilitation plan is not executed and/or one plan is performed instead of another plan).

At step 108, a planning basis is specified. The planning basis is the time period for which the MVA is being performed. In this regard, the planning basis will define the time span for which the vulnerability is being analyzed. To provide an accurate distribution of the cost, there may need to be a buffer for simulating the variations. Often times, a single year is insufficient to provide a comprehensive and accurate cost distribution. To specify the planning basis, embodiments of the invention may specify/decide/define the following attributes: (1) the beginning of the planning period (e.g., Jan. 1, 2022); (2) the total (time) span of the planning period (e.g., 20 years); and/or (3) which assets or components of the system to include (e.g., zone 23+zone 16) (i.e., an identification of a subset of the assets to be included in the simulation). Default values may be established for one or more of the planning basis attributes.

At step 110, random sampling experiments are performed (i.e., multiple probability simulations (e.g., utilizing a Monte Carlo method), that estimate a potential restoration cost for a possible failure, are conducted). The experiments randomly select the assessment time/range (i.e., a randomly sampled age within the planning basis), determine the chance to fail (e.g., the vulnerability potential) for every asset of component within that random time/range, and estimate the restoration cost of the possible failure. Thus, the experiments are based on a randomly sampled age, the survival curve, a randomly sampled chance to survive, and the cost estimation model. In other words, the simulation/experiments include for each asset identified within the planning basis: (i) determining, from the survival curve, the survival probability of the randomly sampled age; (ii) determining that the randomly sampled chance to survive is less than the survival probability of the randomly sampled age; (iii) determining costs associated with the repairs for the possible failure from the cost estimation model; and (iv) adding the determined costs to the vulnerability estimation.

The random sampling experiments of step 110 are repeated until a sufficient/good distribution curve/number of experiments (i.e., a distribution of potential rehabilitation costs) have been conducted. In his regard, if enough experiments are conducted at random ages, the result will be a random probability representing the potential of failure/vulnerability. The number of times the experiments are conducted may be based on a minimum threshold number of times (e.g., 1000 experiments, 2000 experiments, etc.), based on a regression model (e.g., linear or non-linear), or other methodology.

At step 112, the cost distribution is acquired based on the random sampling. In other words, step 110 (and the entire random sampling process) is repeated until an acceptable/good distribution is achieved. The cost distribution may be graphed/drawn based on a best fit/best fitting curve of the random sampling experiments. For the cost distribution, one axis (e.g., the x-axis) may be the cost and a second axis (e.g., the y-axis) may represent the experiments. Curve analysis may be used to determine how/where costs form a distribution/cluster and/or what the median costs are (e.g., 90% likely in certain medium/range).

At step 114, the vulnerability estimation (e.g., consisting of a monetary value) is determined and provided based on the cost distribution. More specifically, the monetary amount and its variation range may be reported according to an acceptable confidence/confidence level (e.g., $15M±$2M). Such an estimation provides an assessment of the vulnerability of a system which can become a base line for additional testing. In one or more embodiments of the invention, the vulnerability estimation may be determined by: (i) determining, based on the distribution of potential rehabilitation costs, a baseline vulnerability assessment; (ii) determining, for each of multiple investment plans, a reduction in vulnerability from the baseline vulnerability assessment; and (iii) selecting and providing one or more of the multiple investment plans based on the determined reductions.

As part of the vulnerability estimation step 114, one or more of the possible failures may be selected based on the vulnerability estimation. Thereafter, repairs associated with the one or more failures states of the selected one or more possible failures may be performed.

Exemplary Use Cases

The monetary vulnerability assessment described above may be utilized in a variety of different applications/use cases. The following description provides some exemplary use cases that may be utilized in accordance with embodiments of the invention. However, it is not the intent to limit the application of the MVA to those applications/use cases described herein.

Capital Preventive Maintenance Planning

Within a capital preventive maintenance planning system, a cost benefit analysis, life cycle analysis, and/or design-build-maintain warrantees analysis/use may take advantage of the MVA in accordance with embodiments of the invention.

For a cost-benefit analysis, it may be noted that every investment to sustain or replace an aging asset or component (before it fails) will essentially extend the asset/component's service life and result in a decreased/lower chance to fail and a reduced vulnerability. Obtaining the MVA of the entire system or a partial part of the system allows the benefits of any investment (whether on the entire system or part of the system) to be easily recognized and compared (e.g., to an investment in another part of the system). For example, in a cost-benefit analysis, risk analysis can be run to determine the overall benefit received from replacing a pipe and/or another part). The more comprehensively the employed cost estimation can be modelled, the broader extent the derived MVA can cover.

A life-cycle analysis enables a framework to monitor and reflect on the asset condition according to the ongoing inspection and maintenance efforts and support the required infrastructure planning and budgeting. More superficially, MVA improves the essential cost estimation function of LCA (life cycle assessment—a method for assessing environmental impacts associated with all the stages of the life cycle of a commercial product) to cover the uncertain nature of operational conditions and asset deterioration. For example, when a pipe is older, more maintenance is needed, and the MVA can assist in determining when the pipe should be replaced.

A design-build-maintain warrantees analysis may utilize MVA to help facilitate greater private sector involvement in preventive maintenance by requiring contractors to make an ongoing commitment to asset preservation. In other words, the MVA would enable a determination of if there is some type of warranty on a system/part of a system, what would be the cost (e.g., to be used to determine the price to purchase the warranty as well as the potential costs associated with maintaining the system in compliance with/to satisfy the warranty).

Capital Improvement Planning (CIP)

Capital improvement planning differs from the preventive maintenance planning and seeks to increase the value or service level of a system through investment. In other words, if there is available investment funds, a CIP plan would determine how and where to spend/invest such funds. Since the impact of various investment options introduces different vulnerabilities to an existing system, the more comprehensively the asset failure or deterioration model can cover, the broader extent the derived MVA can help optimize CIP decisions. For example, if there is an equity/monetary investment from various 3rd parties, the MVA can assist in measuring and determining where and how the most benefit can be achieved.

Sample Application—Asset Life Cycle (ALC) Optimization

One exemplary/sample application is that of ALC optimization for a city water infrastructure system. For example, a city may be planning to apply for a $50M grant from the federal government to improve its aging drinking water distribution infrastructure. The city would like to estimate the vulnerability of its current water network and use it as the baseline to put together a grant application with an optimized Asset Life Cycle (ALC) improvement plan to achieve a sustainable operation for the next 15 years.

The consultant hired by the city first derives a risk model for its water network. The risk model consists of a comprehensive deterioration model for every service line of the network along with an impact study of a possible failed service line. The consultant then puts together a thorough cost estimation model to assess the required investment for replacing or improving any identified service line.

The consultant may then employ the Monte Carlo method to derive the baseline MVA for the next 15 years assuming there is no planned improvement. A GA (genetic algorithm) based study may be further conducted to find the five best ALC investment plans by ranking their effective reduction from the baseline MVA. In other words, embodiments of the invention may utilize the MVA to quantify and show the benefits of different potential improvements to the water network system.

The city engineers along with the management evaluate all five ALC plans together and choose the best one to put together. From there, the group can submit their infrastructure improvement grant application.

MVA Flow and Components

Figure 2:
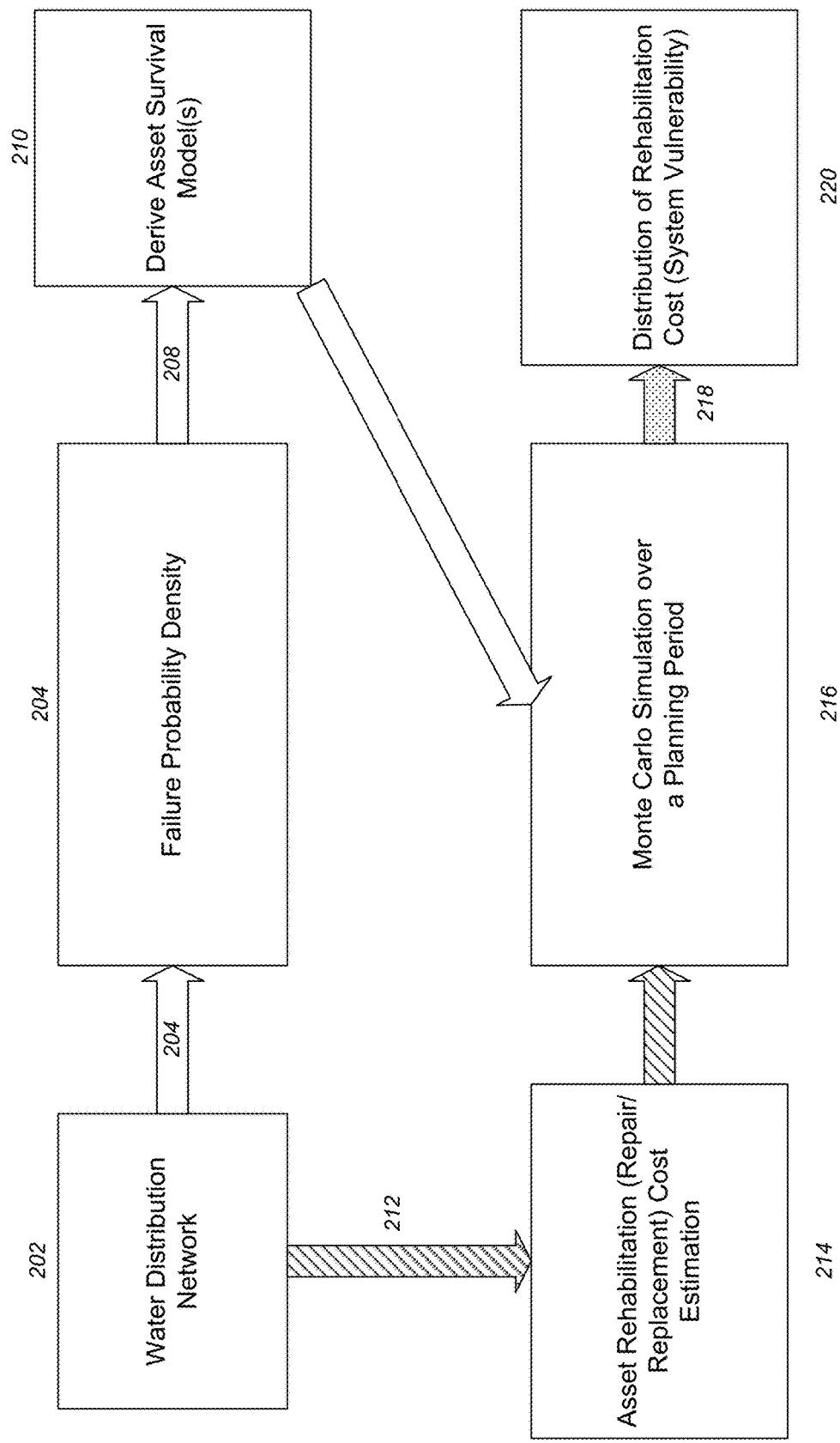
FIG. 2 illustrates an exemplary flow for conducting an MVA in accordance with one or more embodiments of the invention.

FIG. 2 illustrates an exemplary flow for conducting an MVA in accordance with one or more embodiments of the invention. A water distribution network 202 is processed 204 to determine a failure probability density function (PDF) 206. The PDF is used as the basis to derive 208 a survival model/curve 210. In addition, the water distribution network 202 is used as a basis to determine 212 an asset rehabilitation cost estimation plan 214. The survival curve 210 and cost estimation plan 214 are used to perform a Monte Carlo Simulation 216 over a planning period which will output 218 the system vulnerability 220. Details of the components and processing 202-220 are described below.

Survival Curve Determination

Figure 3:
FIG. 3 illustrates an overhead view of a water distribution network utilized in accordance with one or more embodiments of the invention.

FIG. 3 illustrates an overhead view of a water distribution network 202 utilized in accordance with one or more embodiments of the invention. The lines 302 represent the waterflow (e.g., pipes, canals, etc.) and the nodes 304 represent connection points/intersections for the waterflow.

The goal of processing 204 and 208 is to obtain a survival curve/model 210 for each asset of the system. A survival curve/model 210 can be derived once the failure probability density function (PDF) 206 of the system is determined. Regression analysis is one of the effective methods used to produce the PDF according to the failure records.

Step 204 is the processing utilized to calibrate the asset failure model(s) per repair record (i.e., to determine the failure probability density function 206). Within step 204, the following sub-steps may be performed:
(a) Collect the failure asset information from a system archive;
(b) Determine an adequate set of assets that have no failure records and use them to represent the survived assets;
(c) Run sensitivity analysis to cluster these assets into effect sub-groups (e.g., "PVC and CPVC", "Concrete", "Diameter", etc.);
(d) Perform regression analysis to obtain the failure PDF for the system; and
(e) Derive the failure probability density curve for each asset according to their attributes.

Figure 4:
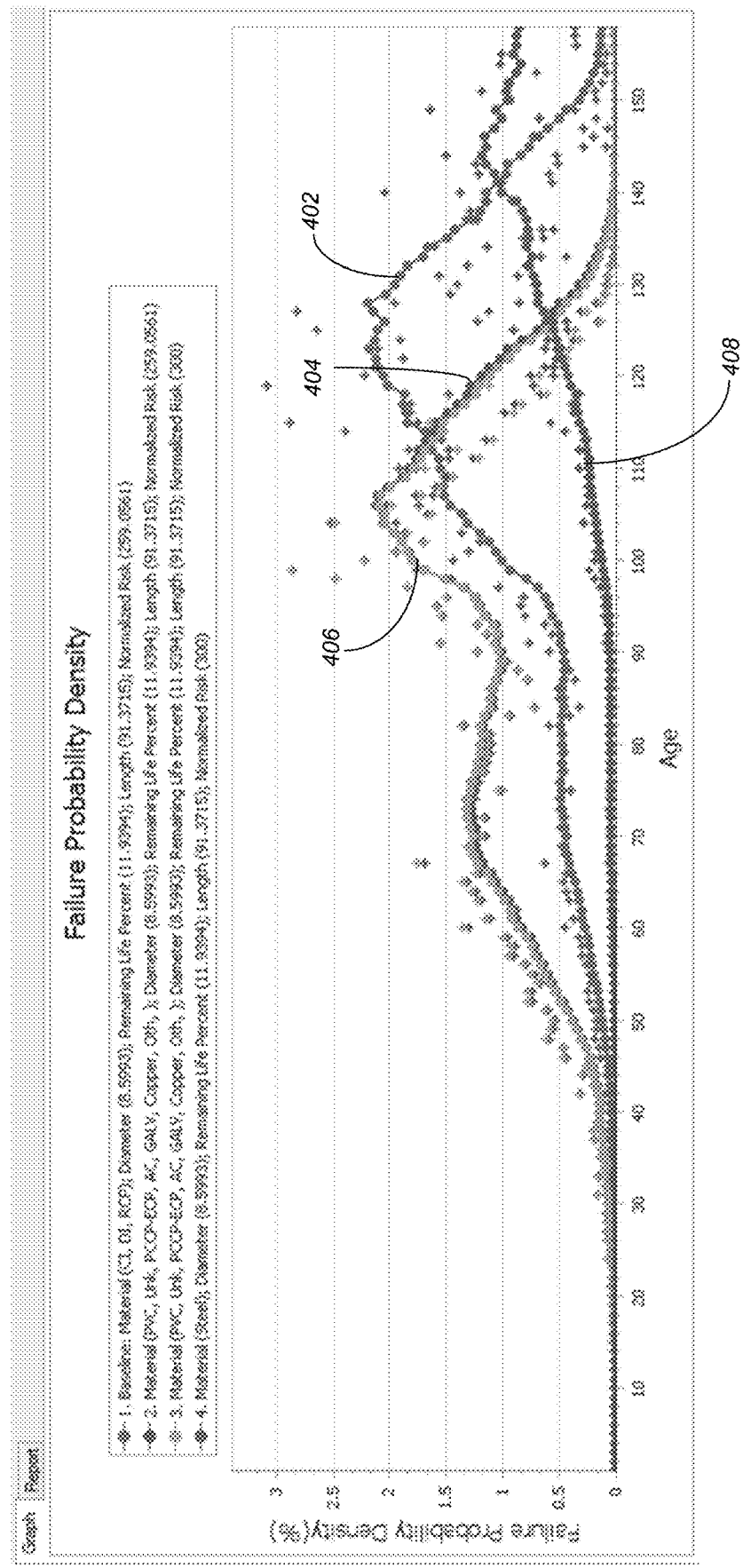
FIG. 4 illustrates an exemplary failure probability density graph generated in accordance with one or more embodiments of the invention.

FIG. 4 illustrates an exemplary failure probability density graph generated in accordance with one or more embodiments of the invention. The vertical axis is the failure probability density percentage (%) and the horizontal ages is the age (e.g., in days). Line 402 represents the baseline and lines 404-408 represent PDFs that have been clustered into effective sub-groups (e.g., for different material and normalized risk combinations). Each point on each line/curve 402-408 represents the failure probability density percentage based on age.

Figure 5A:
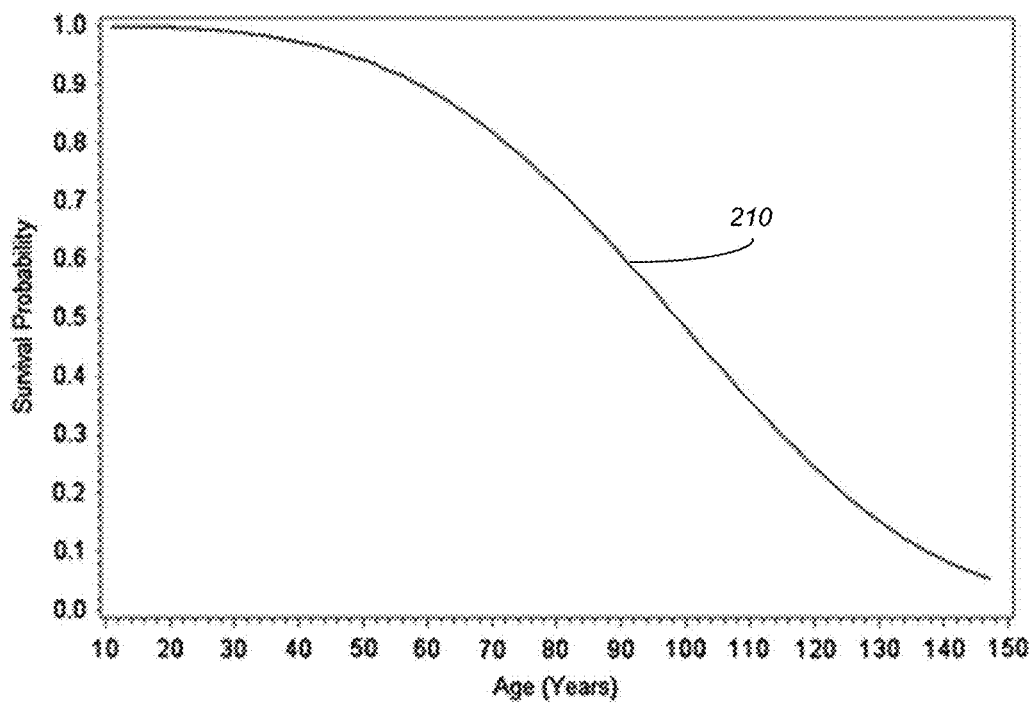
FIG. 5A illustrates an exemplary survival curve in accordance with one or more embodiments of the invention.
Figure 5B:
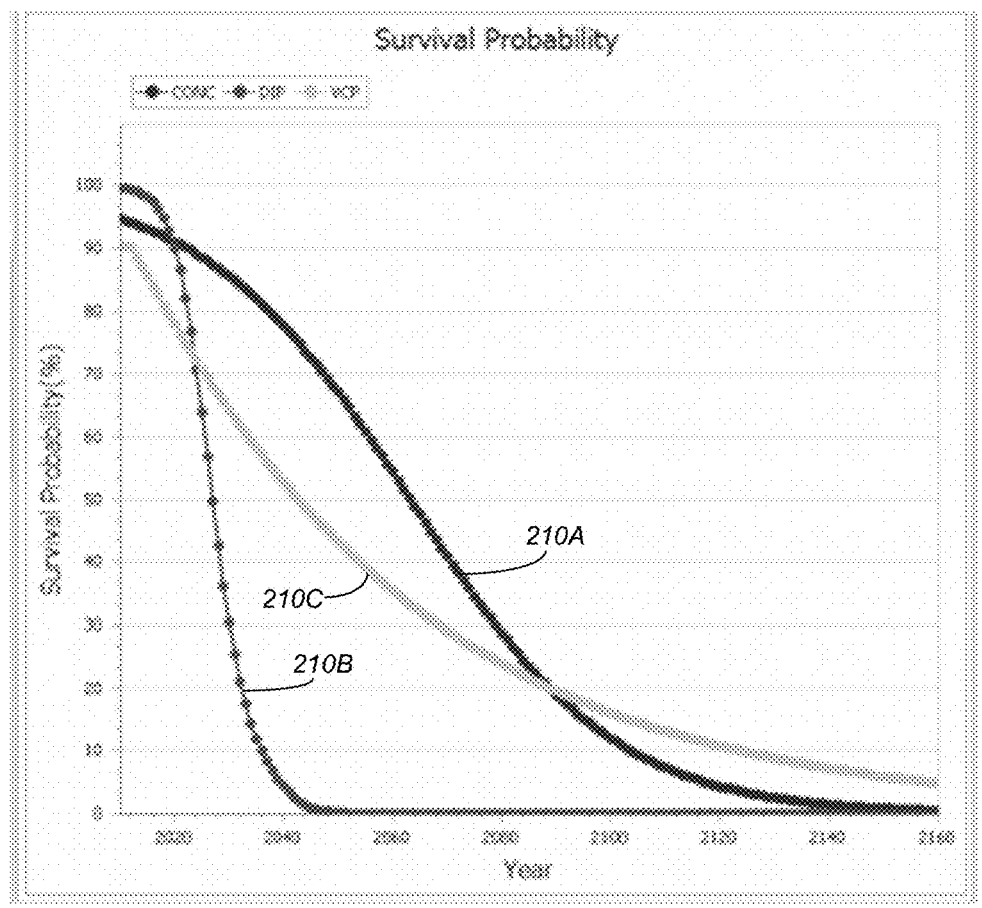
FIG. 5B illustrates several exemplary survival curves for various assets in accordance with one or more embodiments of the invention.

At step 208, an asset survival curve/model 210 is determined/derived for each asset by accumulating its survival probability of each year along the age axis. FIG. 5A illustrates an exemplary survival curve 210 for a single asset with the survival probability on the vertical axis and the age in years along the horizontal axis in accordance with one or more embodiments of the invention. FIG. 5B illustrates several exemplary survival curves 210A-210C for various assets (e.g., concrete 210A, ductile iron pipe [DIP] 210B, and virtual clay pipe [VCP] 210C) in accordance with one or more embodiments of the invention.

A goal of task 212 is to obtain an asset rehabilitation cost estimation plan. Rehabilitation includes all of the prescribed efforts and their associated costs to restore the missing performance of a failed asset. A cost estimation module may extend beyond the cost of the direct labors and materials to consider the monetary estimation of other related losses or impacts. Further, the cost estimation module may support lifecycle planning based on the Time-Value-Of-Money (TVOM) for an organization. In this regard, to generate the plan, inputs may include the location, size, materials, rehabilitation method, length, etc. The plan output by a cost estimation module may include the liner cost per length+ equipment cost+labor cost+etc.

Figure 6A:
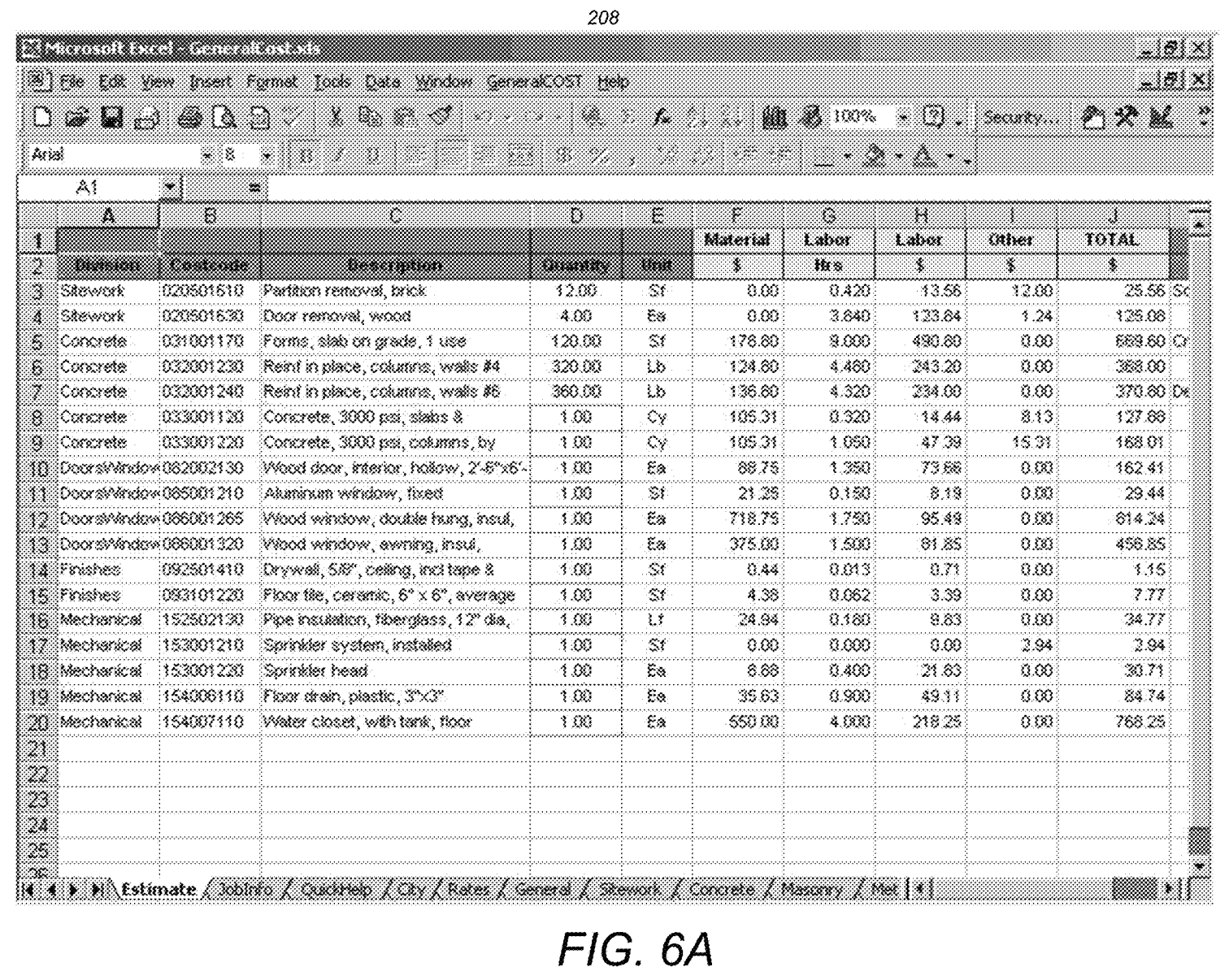

FIGS. 6A and 6B illustrate an exemplary detailed listing/library of an estimated cost for the repair/replacement of various assets within a water distribution network in accordance with one or more embodiments of the invention. Specifically, FIG. 6A illustrates an exemplary cost estimation plan that includes the division, costcode, description, quantity, unit, material cost, labor hours, labor cost, other costs, and the total cost. FIG. 6B illustrates a portion of a cost estimation plan that includes the costs for different materials (e.g., CAS—corrugated aluminum steel pipe, CIPP—cured in place pipe, and CP—corrugated polyethylene pipe) based on diameter and whether it is paved or not.

Figure 7:
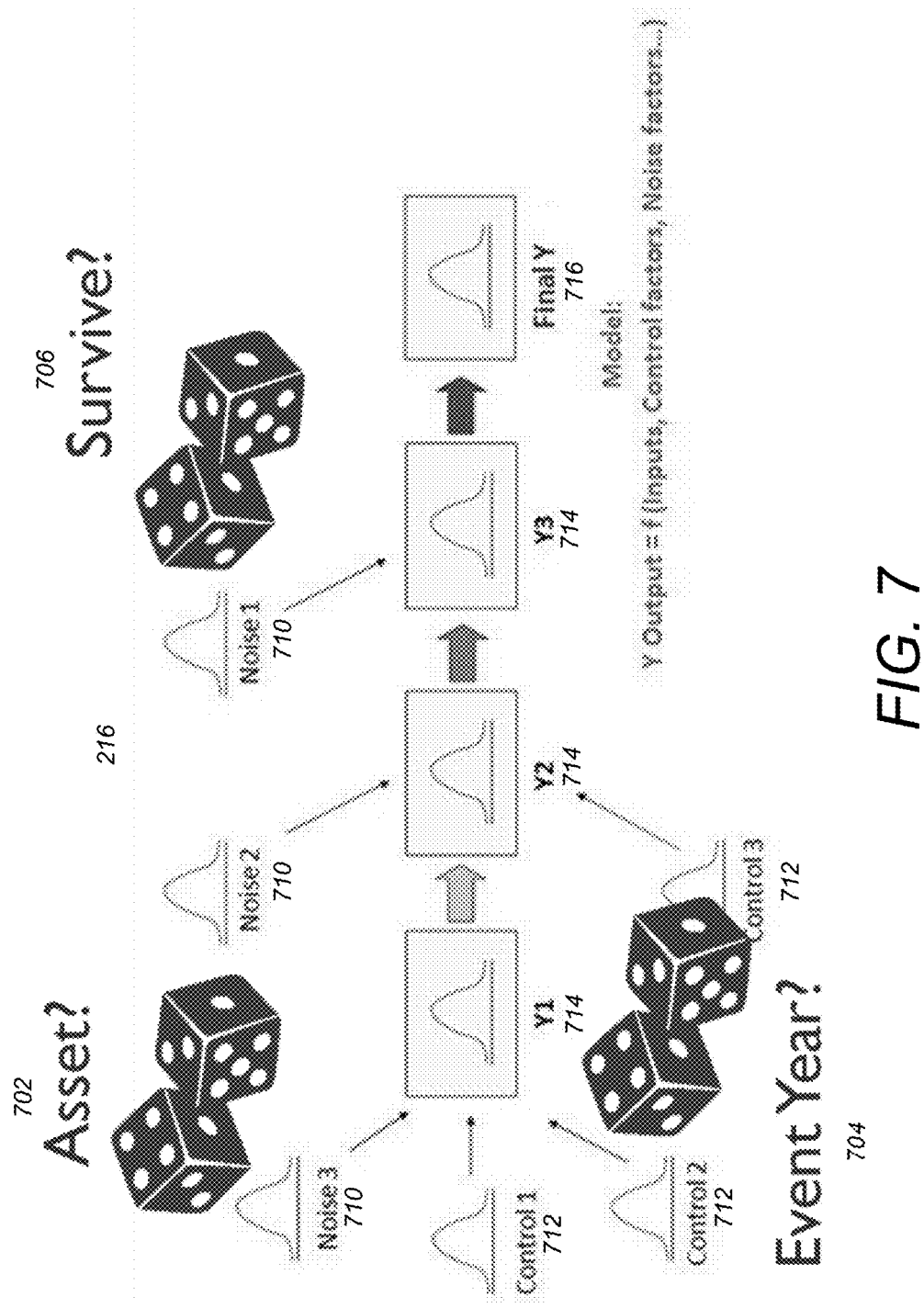
FIG. 7 illustrates the logical flow for conducting an exemplary Monte Carlo Simulation in accordance with one or more embodiments of the invention.

Returning to FIG. 2, both the asset rehabilitation cost estimate 214 and asset survival curve(s)/model(s) 210 are utilized to conduct multiple probability experiments/simulation over a defined planning period (e.g., a Monte Carlo simulation/method 216). FIG. 7 illustrates the logical flow for conducting an exemplary Monte Carlo Simulation 210 in accordance with one or more embodiments of the invention. The pseudo code for performing such a simulation is:

```
For m = 1 to N
    MVA[m] = 0;
    Do each Asset
        Randomly sample the age
        Obtain the survival probability of the age from the asset's
survival model
        Randomly sample the chance to survive
        If chance to survive < survival probability of the age
            Add Rehab cost(Asset) to MVA[m]
        End if
    Next Do
Next For
```

The defined planning period is represented as 1 to N in the pseudo code. It may be noted as the time period increases, the distribution improves. The simulation performs experiments for every asset (of all or a selection of key assets) (the dice in FIG. 7 represent a random selection/sampling). Thus, for each selected asset, based on the defined planning period (1 to N), an age 704 within that period is randomly sampled (i.e., an event year). The simulation then goes to the survival curve/model 210 for that particular asset and retrieves (e.g., based on a query) the probability that the asset will fail (i.e., the failure probabilities) (e.g., 65%). A probability/chance to survive 706 is randomly sampled. If the randomly selected chance to survive is less than the survival probability (retrieved from the survival curve model 210), the rehab cost for the asset is added to the MVA array for that asset. In other words, the comparison determines whether a randomly selected chance to survive exceeds the asset's probability of surviving (as identified on the survival curve 210). If the comparison fails (i.e., the chance to survive is less than the survival probability), then the cost to repair/replace/rehab the asset is added to the MVA. Thus, as illustrated in FIG. 7, the Monte Carlo Simulation 216 takes as input: (a) inputs (e.g., randomly selected assets 702, randomly selected age 704, and randomly selected chances to survive 706); (b) control factors 708; (c) noise factors 710; and (d) other characteristics/attributes needed for simulations 216. The simulation 216 outputs curves Y1 714, Y2 714, ..., YN 714, and composites them together in a Final Y 216 which is representative of the rehabilitation cost.

At step 218, the results of the experiments/simulations are plotted in order to provide the distribution of the rehabilitation cost (system vulnerability) 220.

Figure 8:
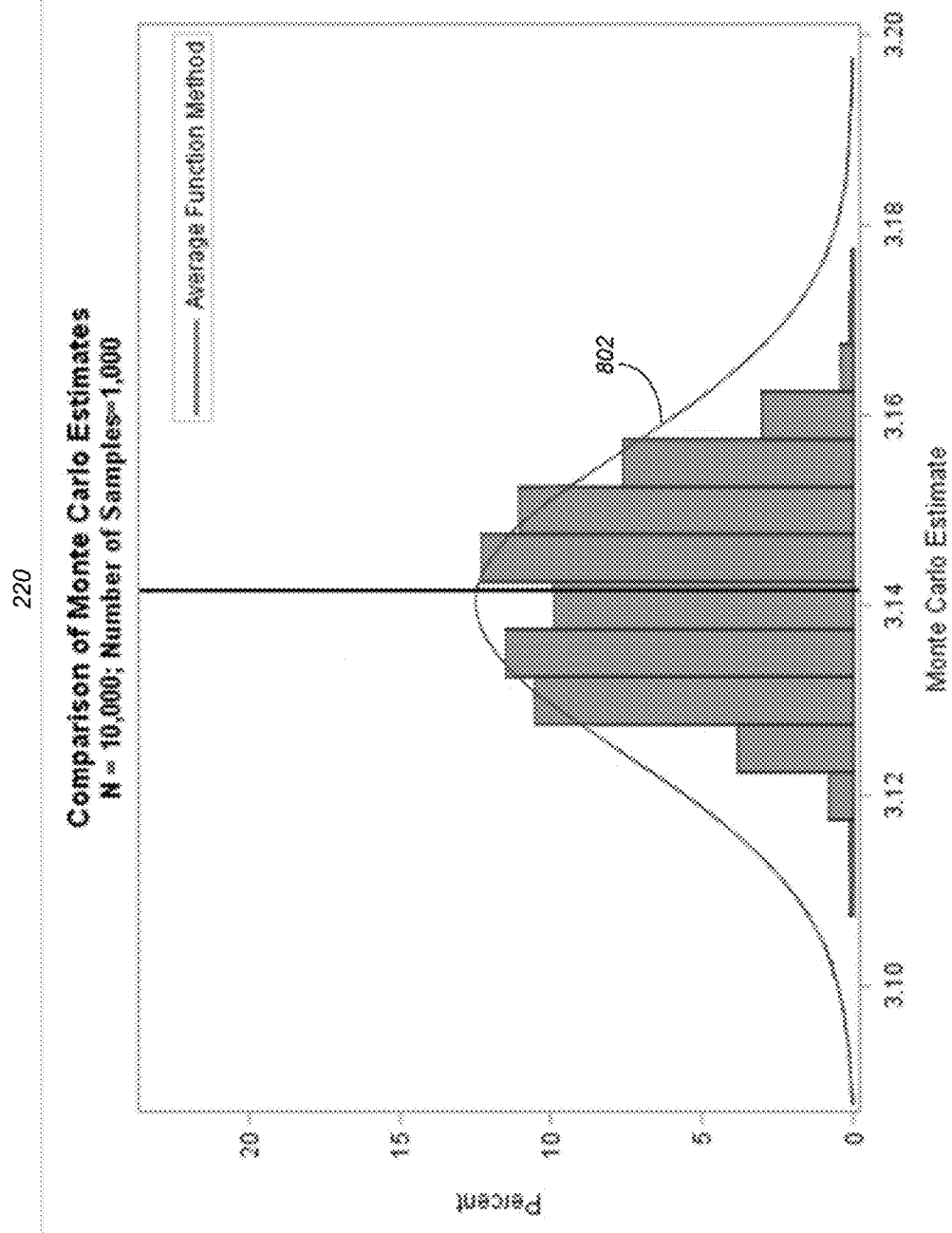
FIG. 8 illustrates an exemplary comparison/plot of estimates/simulations in accordance with one or more embodiments of the invention.

FIG. 8 illustrates an exemplary comparison/plot 220 of the estimates/simulations 216 (e.g., the Monte Carlo Simulations) in accordance with one or more embodiments of the invention. The plot 220 reflects that the experiments were for 10,000 experiments (N=10,000), and 1,000 samples, with the system vulnerability percentage (i.e., tendency of failure) on the vertical access and the estimated rehabilitation cost (Monte Carlo Estimate) on the horizontal axis. The plot 220 can be analyzed/processed to determine the distribution based on the average function method 802 which takes the average rehabilitation cost of all the experiments for each class.

Once the estimated costs have been plotted for a sufficient number of simulations, the cost distribution may be determined and a vulnerability estimation may be provided. Such a vulnerability estimation reports the monetary amount and its variation range for an acceptable level of confidence.

Hardware and Software Environment

Figure 9:
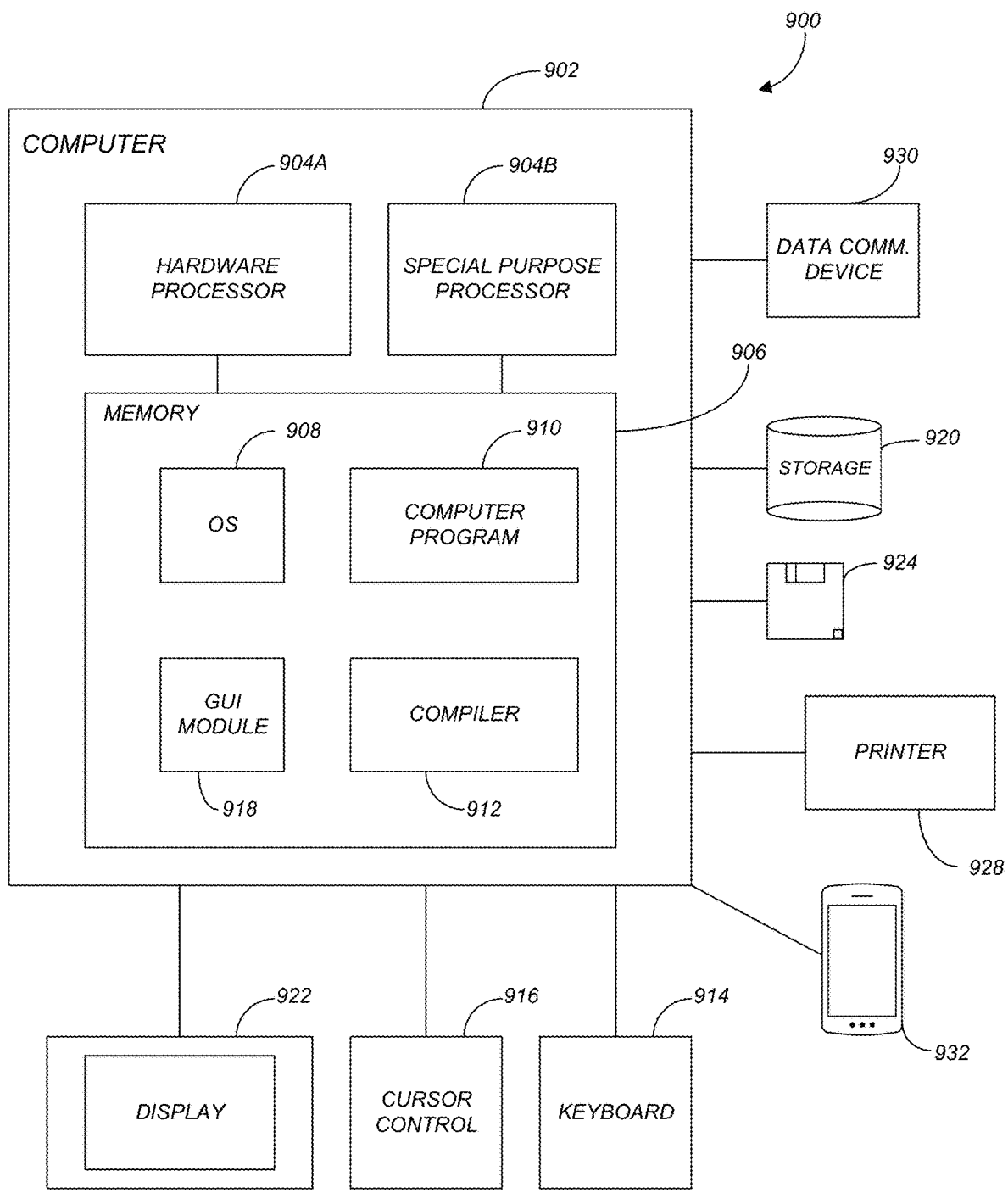
FIG. 9 is an exemplary hardware and software environment used to implement one or more embodiments of the invention.

FIG. 9 is an exemplary hardware and software environment 900 (referred to as a computer-implemented system and/or computer-implemented method) used to implement one or more embodiments of the invention including conducting the vulnerability estimation and or the simulations. The hardware and software environment includes a computer 902 and may include peripherals. Computer 902 may be a user/client computer, server computer, or may be a database computer. The computer 902 comprises a hardware processor 904A and/or a special purpose hardware processor 904B (hereinafter alternatively collectively referred to as processor 904) and a memory 906, such as random access memory (RAM). The computer 902 may be coupled to, and/or integrated with, other devices, including input/output (I/O) devices such as a keyboard 914, a cursor control device 916 (e.g., a mouse, a pointing device, pen and tablet, touch screen, multi-touch device, etc.) and a printer 928. In one or more embodiments, computer 902 may be coupled to, or may comprise, a portable or media viewing/listening device 932 (e.g., an MP3 player, IPOD, NOOK, portable digital video player, cellular device, personal digital assistant, etc.). In yet another embodiment, the computer 902 may comprise a multi-touch device, mobile phone, gaming system, internet enabled television, television set top box, or other internet enabled device executing on various platforms and operating systems.

In one embodiment, the computer 902 operates by the hardware processor 904A performing instructions defined by the computer program 910 (e.g., a computer-aided design [CAD] application) under control of an operating system 908. The computer program 910 and/or the operating system 908 may be stored in the memory 906 and may interface with the user and/or other devices to accept input and commands and, based on such input and commands and the instructions defined by the computer program 910 and operating system 908, to provide output and results.

Output/results may be presented on the display 922 or provided to another device for presentation or further processing or action. In one embodiment, the display 922 comprises a liquid crystal display (LCD) having a plurality of separately addressable liquid crystals. Alternatively, the display 922 may comprise a light emitting diode (LED) display having clusters of red, green and blue diodes driven together to form full-color pixels. Each liquid crystal or pixel of the display 922 changes to an opaque or translucent state to form a part of the image on the display in response to the data or information generated by the processor 904 from the application of the instructions of the computer program 910 and/or operating system 908 to the input and commands. The image may be provided through a graphical user interface (GUI) module 918. Although the GUI module 918 is depicted as a separate module, the instructions performing the GUI functions can be resident or distributed in the operating system 908, the computer program 910, or implemented with special purpose memory and processors.

In one or more embodiments, the display 922 is integrated with/into the computer 902 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 902 according to the computer program 910 instructions may be implemented in a special purpose processor 904B. In this embodiment, some or all of the computer program 910 instructions may be implemented via firmware instructions stored in a read only memory (ROM), a programmable read only memory (PROM) or flash memory within the special purpose processor 904B or in memory 906. The special purpose processor 904B may also be hardwired through circuit design to perform some or all of the operations to implement the present invention. Further, the special purpose processor 904B may be a hybrid processor, which includes dedicated circuitry for performing a subset of functions, and other circuits for performing more general functions such as responding to computer program 910 instructions. In one embodiment, the special purpose processor 904B is an application specific integrated circuit (ASIC).

The computer 902 may also implement a compiler 912 that allows an application or computer program 910 written in a programming language such as C, C++, Assembly, SQL, PYTHON, PROLOG, MATLAB, RUBY, RAILS, HASKELL, or other language to be translated into processor 904 readable code. Alternatively, the compiler 912 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 910 accesses and manipulates data accepted from I/O devices and stored in the memory 906 of the computer 902 using the relationships and logic that were generated using the compiler 912.

The computer 902 also optionally comprises an external communication device such as a modem, satellite link, Ethernet card, or other device for accepting input from, and providing output to, other computers 902.

In one embodiment, instructions implementing the operating system 908, the computer program 910, and the compiler 912 are tangibly embodied in a non-transitory computer-readable medium, e.g., data storage device 920, which could include one or more fixed or removable data storage devices, such as a zip drive, floppy disc drive 924, hard drive, CD-ROM drive, tape drive, etc. Further, the operating system 908 and the computer program 910 are comprised of computer program 910 instructions which, when accessed, read and executed by the computer 902, cause the computer 902 to perform the steps necessary to implement and/or use the present invention or to load the program of instructions into a memory 906, thus creating a special purpose data structure causing the computer 902 to operate as a specially programmed computer executing the method steps described herein. Computer program 910 and/or operating instructions may also be tangibly embodied in memory 906 and/or data communications devices 930, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 902.

Figure 10:
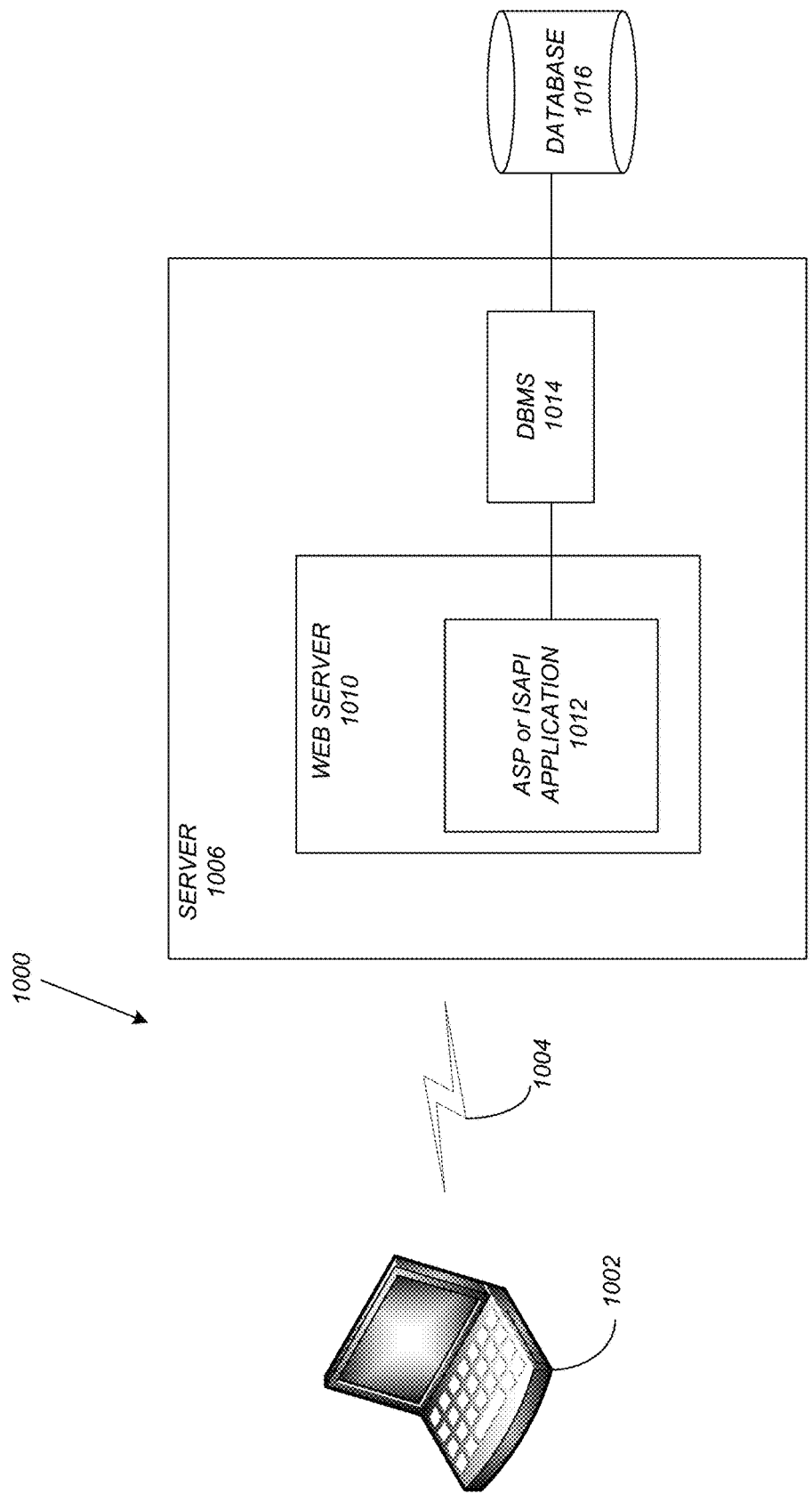
FIG. 10 schematically illustrates a typical distributed/cloud-based computer system in accordance with one or more embodiments of the invention.

FIG. 10 schematically illustrates a typical distributed/cloud-based computer system 1000 using a network 1004 to connect client computers 1002 to server computers 1006. A typical combination of resources may include a network 1004 comprising the Internet, LANs (local area networks), WANs (wide area networks), SNA (systems network architecture) networks, or the like, clients 1002 that are personal computers or workstations (as set forth in FIG. 9), and servers 1006 that are personal computers, workstations, minicomputers, or mainframes (as set forth in FIG. 9). However, it may be noted that different networks such as a cellular network (e.g., GSM [global system for mobile communications] or otherwise), a satellite based network, or any other type of network may be used to connect clients 1002 and servers 1006 in accordance with embodiments of the invention.

A network 1004 such as the Internet connects clients 1002 to server computers 1006. Network 1004 may utilize ethernet, coaxial cable, wireless communications, radio frequency (RF), etc. to connect and provide the communication between clients 1002 and servers 1006. Further, in a cloud-based computing system, resources (e.g., storage, processors, applications, memory, infrastructure, etc.) in clients 1002 and server computers 1006 may be shared by clients 1002, server computers 1006, and users across one or more networks. Resources may be shared by multiple users and can be dynamically reallocated per demand. In this regard, cloud computing may be referred to as a model for enabling access to a shared pool of configurable computing resources.

Clients 1002 may execute a client application or web browser and communicate with server computers 1006 executing web servers 1010. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1002 may be downloaded from server computer 1006 to client computers 1002 and installed as a plug-in or ACTIVEX control of a web browser. Accordingly, clients 1002 may utilize ACTIVEX components/component object model (COM) or distributed COM (DCOM) components to provide a user interface on a display of client 1002. The web server 1010 is typically a program such as MICROSOFT'S INTERNET INFORMATION SERVER.

Web server 1010 may host an Active Server Page (ASP) or Internet Server Application Programming Interface (ISAPI) application 1012, which may be executing scripts. The scripts invoke objects that execute business logic (referred to as business objects). The business objects then manipulate data in database 1016 through a database management system (DBMS) 1014. Alternatively, database 1016 may be part of, or connected directly to, client 1002 instead of communicating/obtaining the information from database 1016 across network 1004. When a developer encapsulates the business functionality into objects, the system may be referred to as a component object model (COM) system. Accordingly, the scripts executing on web server 1010 (and/or application 1012) invoke COM objects that implement the business logic. Further, server 1006 may utilize MICROSOFT'S TRANSACTION SERVER (MTS) to access required data stored in database 1016 via an interface such as ADO (Active Data Objects), OLE DB (Object Linking and Embedding DataBase), or ODBC (Open DataBase Connectivity).

Generally, these components 1000-1016 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1002 and 1006 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1002 and 1006. Embodiments of the invention are implemented as a software/CAD application on a client 1002 or server computer 1006. Further, as described above, the client 1002 or server computer 1006 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, embodiments of the invention combine a random sampling algorithm with an asset deterioration model to introduce a new cost estimation and repair benefit module to obtain an overall cost through a statistic distribution representing the vulnerability of a system (e.g., a water network). Further, embodiments of the invention capture the cost as a monetary value, thereby naturally normalizing the basis and allowing a comparison to be made across different states of the systems or different systems altogether.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for estimating the vulnerability of a repairable infrastructure system, comprising:
   (a) constructing a survival curve for one or more assets of the repairable infrastructure system, wherein the survival curve provides a survival probability for a corresponding asset of the one or more assets based on age;
   (b) prescribing a rehabilitation plan for one or more failure states of the repairable infrastructure system, wherein the rehabilitation plan identifies a restoration for each of the one or more failure states, and each restoration identifies repairs for the one or more assets;
   (c) constructing a cost estimation model for costs associated with the repairs for each of the one or more failure states in the rehabilitation plan;
   (d) specifying a planning basis;
   (e) conducting a multiple probability simulation that estimates a potential restoration cost for a possible failure, wherein:
       (1) the multiple probability simulation is based on a randomly sampled age within the planning basis, the survival curve, a randomly sampled chance to survive, and the cost estimation model; and
       (2) the possible failure comprises one or more of the failure states;
   (f) repeating the multiple probability simulation to acquire a distribution of potential restoration costs; and
   (g) determining and providing a vulnerability estimation based on the distribution.

2. The computer-implemented method of claim 1, wherein the constructing the survival curve comprises:
   collecting failure records from the infrastructure system;
   determining a set of the one or more assets that have no failure records, wherein the set represents survived assets;
   clustering the survived assets into one or more subgroups;
   performing regression analysis on the one or more subgroups to acquire a failure probability density function for the infrastructure system based on the failure records;
   deriving a probability density curve for each of the survived assets based on the failure probability density function, wherein the probability density curve represents a probability that the survived asset will fail based on age; and
   deriving a survival curve for each of the one or more assets by accumulating a survival probability from the probability density curves based on age.

3. The computer-implemented method of claim 2, wherein the clustering is based on a sensitivity analysis.

4. The computer-implemented method of claim 1, wherein the cost estimation model comprises:
   direct costs for direct labor and materials; and
   indirect costs for losses or impacts due to the one or more failure states and the repairs.

5. The computer-implemented method of claim 1, wherein the planning basis comprises:
   a beginning of a planning period;
   a total time span of the planning period; and
   an identification of a subset of the one or more assets to be included in the multiple probability simulation.

6. The computer-implemented method of claim 1, wherein the multiple probability simulation comprises:
   for each asset identified within the planning basis:
       determining, from the survival curve, the survival probability of the randomly sampled age;
       determining that the randomly sampled chance to survive is less than the survival probability of the randomly sampled age;
       determining costs associated with the repairs for the possible failure from the cost estimation model; and
       adding the determined costs to the vulnerability estimation.

7. The computer-implemented method of claim 6, wherein:
the multiple probability simulation utilizes a Monte Carlo method.

8. The computer-implemented method of claim 1, wherein:
the vulnerability estimation comprises a monetary value.

9. The computer-implemented method of claim 1, wherein the determining the vulnerability estimation comprises:
determining, based on the distribution of potential rehabilitation costs, a baseline vulnerability assessment;
determining, for each of multiple investment plans, a reduction in vulnerability from the baseline vulnerability assessment; and
selecting and providing one or more of the multiple investment plans based on the determined reductions.

10. The computer-implemented method of claim 1, further comprising:
selecting, based on the vulnerability estimation, one or more of the possible failures; and
performing the repairs associated with the one or more failures states of the selected one or more possible failures.

11. A computer-implemented system for estimating the vulnerability of a repairable infrastructure system, comprising:
(a) a computer having a memory;
(b) a processor executing on the computer;
(c) the memory storing a set of instructions, wherein the set of instructions, when executed by the processor cause the processor to perform operations comprising:
(1) construct a survival curve for one or more assets of the repairable infrastructure system, wherein the survival curve provides a survival probability for a corresponding asset of the one or more assets based on age;
(2) prescribing a rehabilitation plan for one or more failure states of the repairable infrastructure system, wherein the rehabilitation plan identifies a restoration for each of the one or more failure states, and each restoration identifies repairs for the one or more assets;
(3) constructing a cost estimation model for costs associated with the repairs for each of the one or more failure states in the rehabilitation plan;
(4) specifying a planning basis;
(5) conducting a multiple probability simulation that estimates a potential restoration cost for a possible failure, wherein:
(i) the multiple probability simulation is based on a randomly sampled age within the planning basis, the survival curve, a randomly sampled chance to survive, and the cost estimation model; and
(ii) the possible failure comprises one or more of the failure states;
(6) repeating the multiple probability simulation to acquire a distribution of potential restoration costs; and
(7) determining and providing a vulnerability estimation based on the distribution.

12. The computer-implemented system of claim 11, wherein the operations constructing the survival curve comprise:
collecting failure records from the infrastructure system;
determining a set of the one or more assets that have no failure records, wherein the set represents survived assets;
clustering the survived assets into one or more subgroups;
performing regression analysis on the one or more subgroups to acquire a failure probability density function for the infrastructure system based on the failure records;
deriving a probability density curve for each of the survived assets based on the failure probability density function, wherein the probability density curve represents a probability that the survived asset will fail based on age; and
deriving a survival curve for each of the one or more assets by accumulating a survival probability from the probability density curves based on age.

13. The computer-implemented system of claim 12, wherein the clustering is based on a sensitivity analysis.

14. The computer-implemented system of claim 11, wherein the cost estimation model comprises:
direct costs for direct labor and materials; and
indirect costs for losses or impacts due to the one or more failure states and the repairs.

15. The computer-implemented system of claim 11, wherein the planning basis comprises:
a beginning of a planning period;
a total time span of the planning period; and
an identification of a subset of the one or more assets to be included in the multiple probability simulation.

16. The computer-implemented system of claim 11, wherein the multiple probability simulation comprises:
for each asset identified within the planning basis:
determining, from the survival curve, the survival probability of the randomly sampled age;
determining that the randomly sampled chance to survive is less than the survival probability of the randomly sampled age;
determining costs associated with the repairs for the possible failure from the cost estimation model; and
adding the determined costs to the vulnerability estimation.

17. The computer-implemented system of claim 16, wherein:
the multiple probability simulation utilizes a Monte Carlo method.

18. The computer-implemented system of claim 11, wherein:
the vulnerability estimation comprises a monetary value.

19. The computer-implemented system of claim 11, wherein the operations determining the vulnerability estimation comprise:
determining, based on the distribution of potential rehabilitation costs, a baseline vulnerability assessment;
determining, for each of multiple investment plans, a reduction in vulnerability from the baseline vulnerability assessment; and
selecting and providing one or more of the multiple investment plans based on the determined reductions.

20. The computer-implemented system of claim 11, wherein the operations further comprise:
selecting, based on the vulnerability estimation, one or more of the possible failures; and
performing the repairs associated with the one or more failures states of the selected one or more possible failures.

* * * * *